(12) United States Patent
Zeydel

(10) Patent No.: US 12,334,986 B2
(45) Date of Patent: Jun. 17, 2025

(54) METHODS, SYSTEMS, AND APPARATUSES FOR PASSIVE OPTICAL NETWORKS

(71) Applicant: MACOM TECHNOLOGY SOLUTIONS HOLDINGS, INC., Lowell, MA (US)

(72) Inventor: Bart Zeydel, Fair Oaks, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 126 days.

(21) Appl. No.: 18/101,538

(22) Filed: Jan. 25, 2023

(65) Prior Publication Data

US 2023/0239056 A1 Jul. 27, 2023

Related U.S. Application Data

(60) Provisional application No. 63/303,476, filed on Jan. 26, 2022, provisional application No. 63/303,412, filed on Jan. 26, 2022.

(51) Int. Cl.
*H04B 10/60* (2013.01)
*H04B 10/27* (2013.01)
(Continued)

(52) U.S. Cl.
CPC ............ *H04B 10/60* (2013.01); *H04B 10/27* (2013.01); *H04B 10/516* (2013.01);
(Continued)

(58) Field of Classification Search
CPC ........ H04B 10/60; H04B 10/27; H04B 10/66; H04B 10/5161; H04B 10/272; H04B 10/516; H04B 10/69; H04B 10/695
(Continued)

(56) References Cited

U.S. PATENT DOCUMENTS 9,699,009 B1 * 7/2017 Ainspan ................ H04L 25/49
10,396,896 B2 * 8/2019 Riani ..................... H04L 27/34
(Continued)

FOREIGN PATENT DOCUMENTS

CN 1155172 6/2004
JP 2012114738 6/2012
(Continued)

OTHER PUBLICATIONS

Elaine S. Chou and Joseph M. Kahn, "Adaptive Coding and Modulation for Robust Optical Access Networks," Journal of Lightwave Technology, IEEE, USA, vol. 38, No. 8, Dec. 31, 2019, pp. 2242-2252.
(Continued)

*Primary Examiner* — Dibson J Sanchez

(57) ABSTRACT

In various embodiments, the present disclosure includes a system for sending 50 gigabits per second (Gbps), 75 Gbps, and 100 Gbps at 50 gigabaud (GBaud) for passive optical networks (PON) downstream and upstream. The system allows for transmission of three data rates at a single baud-rate while only using 2-bits of information per sample. A motivation for sending three data rates at a single baud-rate is to allow for further granularity in the control of the data-rates for downstream and upstream traffic in a flexible PON system based on the link margin. For example, the system can use non-return-to-zero (NRZ) at 50 GBaud for 50 Gbps and can use four-level pulse-amplitude modulation (PAM-4) at 50 GBaud for 100 Gbps. In addition for 75 Gbps, a double square-8 (DSQ-8) constellation can be used at 50 GBaud.

20 Claims, 11 Drawing Sheets

(51) Int. Cl.
*H04B 10/516* (2013.01)
*H04B 10/69* (2013.01)

(52) U.S. Cl.
CPC .......... *H04B 10/5161* (2013.01); *H04B 10/69* (2013.01); *H04B 10/695* (2013.01)

(58) Field of Classification Search
USPC .................. 398/43–103, 182–201, 202–214
See application file for complete search history.

(56) References Cited

U.S. PATENT DOCUMENTS

| | | | | |
|---|---|---|---|---|
| 2007/0160371 | A1* | 7/2007 | Irie | H04L 7/027 398/43 |
| 2009/0154455 | A1* | 6/2009 | Diab | H04L 47/10 370/389 |
| 2010/0232798 | A1* | 9/2010 | Kozaki | H04Q 11/0067 370/503 |
| 2011/0222866 | A1* | 9/2011 | Mashimo | H04B 10/272 398/202 |
| 2014/0056585 | A1* | 2/2014 | Qian | H04B 10/61 398/58 |
| 2014/0294388 | A1* | 10/2014 | Odaka | H04J 3/1694 398/66 |
| 2016/0105236 | A1 | 4/2016 | Zhang et al. | |
| 2018/0343065 | A1* | 11/2018 | Li | H04B 10/516 |
| 2019/0089466 | A1* | 3/2019 | Li | H04B 10/5161 |
| 2021/0028857 | A1* | 1/2021 | Inuzuka | H04B 10/25 |
| 2023/0098306 | A1* | 3/2023 | Ishii | H04B 10/07955 398/37 |
| 2023/0171135 | A1* | 6/2023 | Gutierrez Castrejon | H04B 10/697 375/286 |
| 2023/0198631 | A1* | 6/2023 | Levin | H04L 25/03343 398/208 |

FOREIGN PATENT DOCUMENTS

| | | |
|---|---|---|
| WO | 2018162743 | 9/2018 |
| WO | 2021229265 | 11/2021 |

OTHER PUBLICATIONS

International Telecommunication Union, ITU-T G.9804.3 "50-Gigabit-capable passive optical networks (50G-PON): Physical media dependent (PMD) layer specification", (Sep. 2021), Geneva, Switzerland, 50 pages.
R. Borkowski et al., "FLCS-PON—A 100 Gbit/s Flexible Passive Optical Network: Concepts and Field Trial", Journal of Lightwave Technology, vol. 39, No. 16, IEEE, Aug. 15, 2021, pp. 5314-5324.

* cited by examiner

METHODS, SYSTEMS, AND APPARATUSES FOR PASSIVE OPTICAL NETWORKS

CROSS-REFERENCE TO RELATED APPLICATIONS

This application claims the benefit of U.S. Provisional Patent Application No. 63/303,412 filed on Jan. 26, 2022 entitled "System for Transmitting 3 Data Rates at Fixed Buad-Rate Using 2-Bits Per Sample for Passive Optical Networks," by Bart ZEYDEL, which is hereby incorporated by reference.

This application claims the benefit of U.S. Provisional Patent Application No. 63/303,476 filed on Jan. 26, 2022 entitled "Receiver Supporting Multiple Interleaved Downstream Data Rates at Fixed Baud-Rate for Flexible Passive Optical Networks," by Bart ZEYDEL, which is hereby incorporated by reference.

BACKGROUND

Passive optical networks (PON) utilize a downstream broadcast from a single terminal to multiple terminals. In traditional PON systems the downstream rate is fixed (for a given wavelength) and the upstream traffic is received in time interleaved bursts from the endpoints at multiple rates that are an integer multiple of the downstream traffic. For example, FIG. 1 shows an ITU-T 50-Gigabit-capable passive optical networks (50 G-PON) system where the downstream rate is 50 gigabits per second (Gbps) and upstream rate for bursts can be either 50 Gbps, 25 Gbps, or 12.5 Gbps. For both upstream and downstream traffic to be placed on the optical distribution network (ODN), the data is provided to the optical line termination or optical line terminal (OLT) and optical network unit (ONU) using as few bits as possible. For 50 Gbps non-return-to-zero (NRZ), this requires 1-bit of information per sample. However, it is desirable to have a higher data rate for upstream and downstream traffic to improve the overall customer experience with the optical distribution network.

A proposal was made to support 50 gigabaud (GBaud) NRZ being defined in the ITU-T 50 G-PON system and 100 Gbps 50 GBaud four-level pulse-amplitude modulation (PAM-4), which allows for a system to alternate between transmitting 50 Gbps and 100 Gbps for the downstream link using 2-bits of information per sample. Also proposed was the use of 100 Gbps at 50 GBaud in the upstream direction as an option for the upstream burst from an optical network terminal (ONT) or optical network unit (ONU). The two rates are achieved as follows: 50 Gbps is achieved using 50 GBaud NRZ; and 100 Gbps is achieved using 50 GBaud PAM-4 (4-level modulation per sample). The reason for using the different rates is to allow for links that have additional link margin to operate at a higher data rate. For example, a link that is closer to the OLT (has less optical power loss) could operate at 100 Gbps, while a link that is farther away and has more optical power loss would need to operate at 50 Gbps. To achieve the desired signal-to-noise ratio (SNR) improvement when sending NRZ compared to PAM-4, the outer modulation amplitude (OMA) of NRZ and PAM-4 are the same. FIG. 2 shows two-dimensional (2D) 2-bit constellation diagrams 202 and 204 for NRZ and PAM-4, respectively, at 50 GBaud. Note that for both constellation diagrams 202 and 204, the 1st symbol on the X-axis represents the first bit of information in time while the 2nd symbol on the Y-axis represents the second bit of information in time. As shown in FIG. 2, the worst case spacing between constellation points can be seen to be a delta of 3 for NRZ and a delta of 1 for PAM-4. The spacing difference is what results in the SNR improvement which allows for NRZ to operate on links with more optical power loss (OPL) compared to PAM-4.

FIG. 3 shows a flexible PON with 50 Gbps and 100 Gbps downstream on a single wavelength and 100 Gbps (PAM-4), 50 Gbps (NRZ), 25 Gbps (NRZ), and 12.5 Gbps (NRZ) upstream bursts. In this system of FIG. 3 each of the ONT receivers will operate in one of two scenarios. The first scenario is a link over which an ONT can only receive 50 Gbps traffic. The second scenario is a link where the ONT can receive PAM-4, and thus by definition also has sufficient SNR to receive NRZ. In all scenarios the ONT receiver can recover the bits of information transmitted at 50 Gbps. However, note that at least one disadvantage of the system of FIG. 3 is that the downstream rate drops by half when the 100 Gbps rate cannot be supported by one or more link margins of the system. In addition, the upstream bursts also drops by half when the 100 Gbps rate cannot be supported by one or more link margins of the system.

SUMMARY

Various embodiments in accordance with the present disclosure can address the disadvantages described above.

In various embodiments, the present disclosure includes a system for sending 50 gigabits per second (Gbps), 75 Gbps, and 100 Gbps at 50 gigabaud (GBaud) for passive optical networks (PON) downstream and upstream. The system allows for transmission of three data rates at a single baud-rate while only using 2-bits of information per sample. A motivation for sending three data rates at a single baud-rate is to allow for further granularity in the control of the data-rates for downstream and upstream traffic in a flexible PON system based on the link margin. For example, in various embodiments, the system can use non-return-to-zero (NRZ) at 50 GBaud for 50 Gbps and can use four-level pulse-amplitude modulation (PAM-4) at 50 GBaud for 100 Gbps. In addition for 75 Gbps, a double square-8 (DSQ-8) constellation can be used at 50 GBaud. This constellation allows for 1.5 bits to be sent per sample, by encoding 3-bits of information into two successive 2-bit samples. In various embodiments, note that this system of the present disclosure is not adding significant complexity to a system that only sends 50 Gbps and 100 Gbps at 50 GBaud for a flexible PON downstream and upstream. In various embodiments, the system is basically using similar components for the most part that would be used for a system that only sends 50 Gbps and 100 Gbps at 50 GBaud for flexible PON downstream and upstream with some slight additional processing and adds another rate (e.g., 75 Gbps) transparently to the transmitter with little overhead to the receiver (e.g., as described herein) and without latency overhead. In this manner, faster reception of data upstream and downstream can be provided in a flexible PON in various embodiments.

While various embodiments in accordance with the present disclosure have been specifically described within this Summary, it is noted that the claimed subject matter are not limited in any way by these various embodiments.

BRIEF DESCRIPTION OF THE DRAWINGS

The accompanying drawings, which are incorporated in and form a part of this specification and in which like numerals depict like elements, illustrate embodiments of the present disclosure and, together with the detailed description, serve to explain the principles of the disclosure. The drawings are not necessarily to scale.

DETAILED DESCRIPTION

Figure 1:
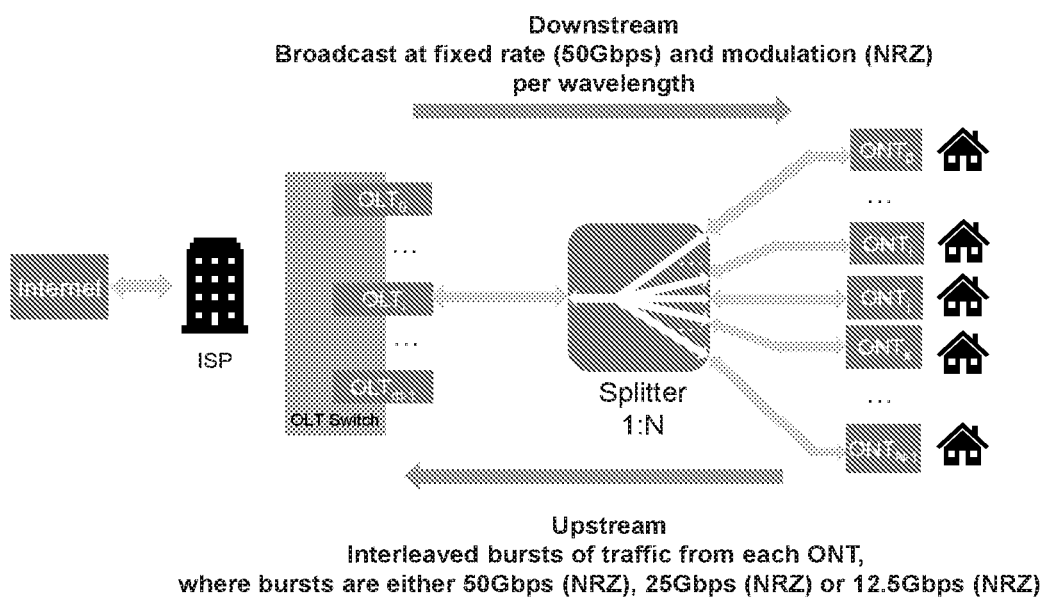
FIG. 1 shows an ITU-T 50-Gigabit-capable passive optical networks (50 Gbps PON) system.
Figure 2:
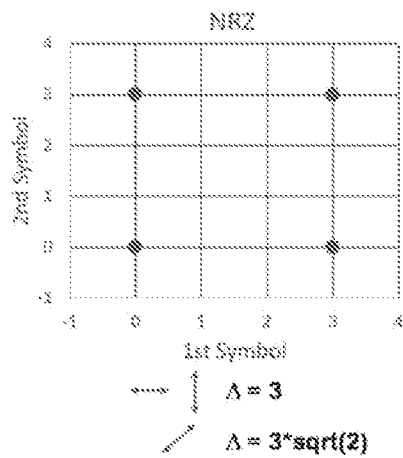
FIG. 2 shows two-dimensional (2D) 2-bit constellation diagrams for both non-return-to-zero (NRZ) and four-level pulse-amplitude modulation (PAM-4) at 50 GBaud.
Figure 2:
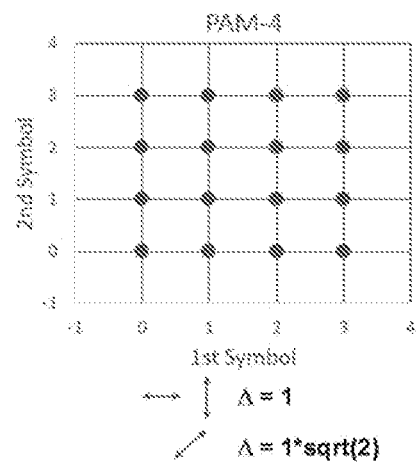
Figure 3:
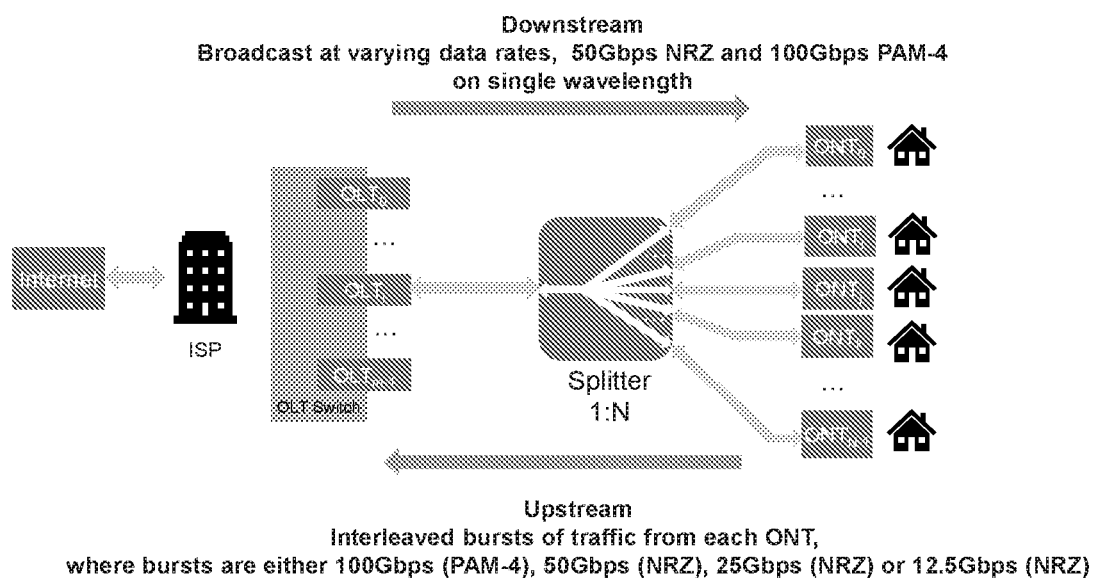
FIG. 3 shows a flexible PON with 50 Gbps and 100 Gbps downstream on a single wavelength and 100 Gbps (PAM-4), 50 Gbps (NRZ), 25 Gbps (NRZ), and 12.5 Gbps (NRZ) upstream bursts.

Reference will now be made in detail to various embodiments in accordance with the present disclosure, examples of which are illustrated in the accompanying drawings. While described in conjunction with various embodiments, it will be understood that these various embodiments are not intended to limit the present disclosure. On the contrary, the present disclosure is intended to cover alternatives, modifications and equivalents, which may be included within the scope of the present disclosure. Furthermore, in the following detailed description of various embodiments in accordance with the present disclosure, numerous specific details are set forth in order to provide a thorough understanding of the present disclosure. However, it will be evident to one of ordinary skill in the art that the present disclosure may be practiced without these specific details or with equivalents thereof. In other instances, well known methods, procedures, components, and circuits have not been described in detail as not to unnecessarily obscure aspects and features of the present disclosure.

Some portions of the detailed descriptions that follow are presented in terms of procedures and other representations of operations for systems, devices, and apparatuses like those disclosed herein. These descriptions and representations are the means used by those skilled in the art most effectively convey the substance of their work to others skilled in the art. In various embodiments of the present application, a procedure, operation, or the like, is conceived to be a self-consistent sequence of steps or instructions leading to a desired result. Operations described as separate blocks may be combined and performed in the same process step (that is, in the same time interval, after the preceding process step and before the next process step). Also, the operations may be performed in a different order than the order in which they are described herein. Furthermore, other processes and steps may be performed along with the processes and steps discussed herein; that is, there may be a number of process steps before, in between, and/or after the steps shown and described herein. Importantly, various embodiments according to the present disclosure can be implemented in conjunction with these other (perhaps conventional) processes and steps without significantly perturbing them. Generally speaking, various embodiments according to the present disclosure can replace portions of a conventional process without significantly affecting peripheral processes and steps.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "transmitting," "receiving," "determining," "identifying," "implementing," "controlling," "inputting," "operating," "analyzing," "generating," "extracting," "processing," "acquiring," "performing," "producing," "providing," "communicating," "storing," "creating," "computing," "loading" or the like, refer to actions and processes of a computing system or similar electronic computing device or processor. The computing system or similar electronic computing device manipulates and transforms data represented as physical (electronic) quantities within the computing system memories, registers or other such information storage, transmission or display devices.

Portions of the detailed description that follow are presented and discussed in terms of one or more methods. Although steps and sequencing thereof are disclosed in figures herein describing the operations of the one or more methods, such steps and sequencing are exemplary. Any method is well suited to performing various other steps or variations of the steps recited and/or shown herein, and in a sequence other than that depicted and/or described herein.

Various embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes, but is not limited to, volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

In various embodiments, the present disclosure can include a system for transmitting three data rates at a fixed baud-rate using 2-bits per sample for passive optical networks (PON). More specifically, in various embodiments, the present disclosure can include a system for sending 50 gigabits per second (Gbps), 75 Gbps, and 100 Gbps at 50 gigabaud (GBaud) for passive optical networks downstream and upstream. The system allows for transmission of three data rates at a single baud-rate while only using 2-bits of information per sample. A motivation for sending three data rates at a single baud-rate is to allow for further granularity in the control of the data-rates for downstream and upstream traffic in a flexible passive optical networks (PON) system based on the link margin. For example, in various embodiments, the system can use non-return-to-zero (NRZ) modulation at 50 GBaud for 50 Gbps and can use four-level pulse-amplitude modulation (PAM-4) at 50 GBaud for 100 Gbps. In addition for 75 Gbps, a double square-8 (DSQ-8) constellation can be used at 50 GBaud. This constellation allows for 1.5 bits to be sent per sample, by encoding 3-bits of information into two successive 2-bit samples.

Figure 4:
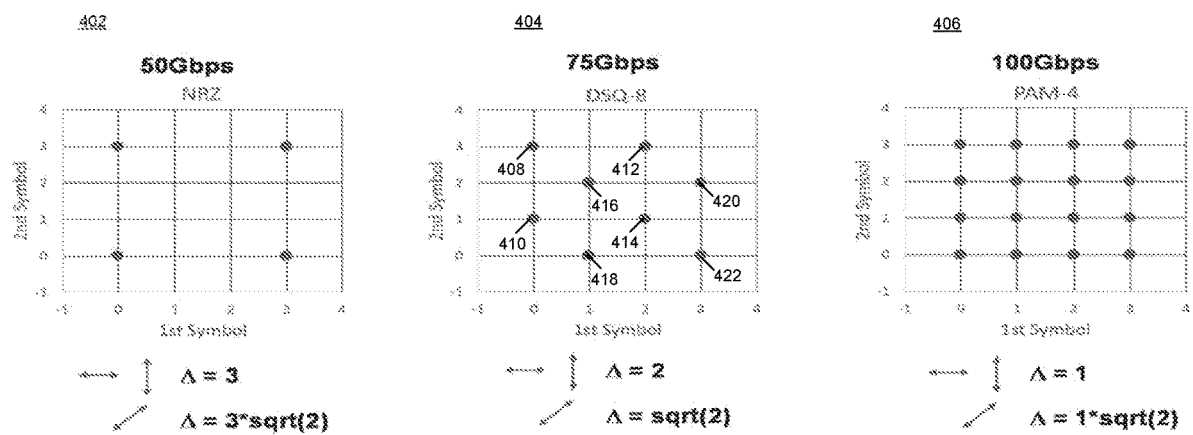
FIG. 4 shows 2D 2-bit constellation diagrams for 100 Gbps (PAM-4), 75 Gbps (double square-8 (DSQ-8)), and 50 Gbps (NRZ) at 50 GBaud in accordance with various embodiments of the present disclosure.

FIG. 4 shows two-dimensional (2D) 2-bit constellation diagrams 406, 404, and 402 for 100 Gbps (PAM-4), 75 Gbps (double square-8 (DSQ-8)), and 50 Gbps (NRZ), respectively, at 50 GBaud in accordance with various embodiments of the present disclosure. It is noted that a system in accordance with various embodiments of the present disclosure can allow for only 2-bits per sample to be used to achieve the three desired data rates (e.g., 50 Gbps, 75 Gbps, and 100 Gbps), with the desired increase in worst case constellation spacing which allows for operation over links with different optical power loss for whatever reasons. A motivation for sending three data rates at a single baud-rate is to allow for further granularity in the control of the data-rates for downstream and upstream traffic in a flexible PON system based on the link margin. For example, within constellation diagram 402 the 50 Gbps NRZ worst case constellation point spacing is 3 (e.g., vertical and horizontal delta equal to 3), within constellation diagram 404 the 75 Gbps DSQ-8 worst case spacing is the square root of 2 (sqrt(2)) (e.g., diagonal delta equal to sqrt(2)), and within constellation diagram 406 the 100 Gbps PAM-4 worst case spacing is 1 (e.g., vertical and horizontal delta equal to 1).

Note that a flexible PON system in accordance with various embodiments of the present disclosure has the ability to selectively increase the speed of a particular link based on optical power loss and link margin. For example, in various embodiments, for an ONT receiver there can be three scenarios that exist for this flexible PON system: 1) a link with ONT is capable of only receiving 50 Gbps; 2) a link with ONT is capable of only receiving 75 Gbps and 50 Gbps; and 3) a link with ONT is capable of receiving 100 Gbps, 75 Gbps, and 50 Gbps. Note that each of these scenarios is further described herein with reference to FIGS. 5, 6, and 7, respectively.

With reference to FIG. 4, in various embodiments, a system is able to dynamically switch between the constellations 402, 404, and 406 at a single baud-rate for downstream and upstream traffic in a flexible PON system based on the link margin. Specifically, in various embodiments, a system is able to dynamically switch between the NRZ constellation 402, the DSQ-8 constellation 404, and PAM-4 constellation 406 at a single baud-rate for downstream and upstream traffic in a flexible PON system based on the link margin. In this manner, this allows for further granularity in the control of the data-rates for downstream and upstream traffic in a flexible PON system based on the link margin.

Note that within the DSQ-8 constellation 404, it depends on both the 1st symbol and 2nd symbol. In this manner, it is noted that the 1st symbol is restricted based on the 2nd symbol. For example, if the 1st symbol is transmitted as a 1 or a 3, then the 2nd symbol can only transmit as a 0 or a 2. Therefore, within the DSQ-8 constellation 404, there is a restriction on the point square formed by points 408, 410, 412, and 414 and the point square formed by points 416, 418, 420, and 422 where they are paired up such that they cannot be sent without knowing the pair of the symbol. Whereas with the PAM-4 constellation 406, a 0, 1, 2, or 3 can be sent as the 1st symbol and the 2nd symbol regardless of what was previously sent. Furthermore, with the NRZ constellation 402, a 0 or a 3 can be sent as the 1st symbol and the 2nd symbol regardless of what was previously sent.

Figure 5:
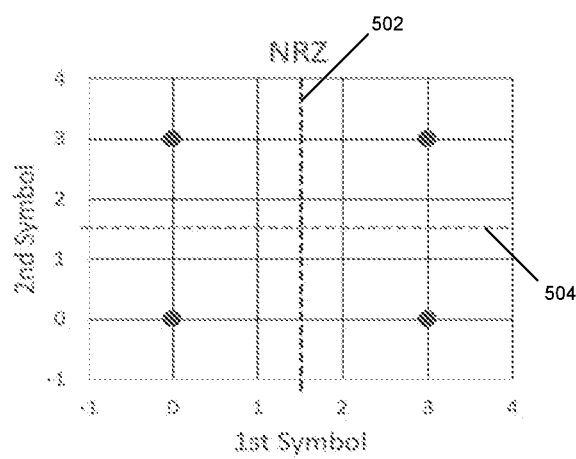
FIG. 5 shows a 2D 2-bit constellation diagram in accordance with various embodiments of the present disclosure.

FIG. 5 shows a 2D 2-bit constellation diagram 500 in accordance with various embodiments of the present disclosure. For example, on a link where the ONU can only recover 50 Gbps NRZ, the receiver can implement an NRZ slicer as shown by the constellation diagram 500 to recover 50 Gbps traffic in accordance with various embodiments of the present disclosure. For example, in various embodiments, to determine whether a received signal or bit (e.g., the 1st symbol or 2nd symbol) of the 50 Gbps traffic is a zero or a 3, the NRZ slicer can determine if it is greater than 1.5 or less than 1.5 shown by dashed lines 502 and 504 of the constellation diagram 500. Specifically, if the received signal or bit (e.g., the 1st symbol or 2nd symbol) of the 50 Gbps traffic is greater than or equal to 1.5 (as shown by dashed line 502 or 504), the NRZ slicer can determine that is a 3. And if the received signal or bit of the 50 Gbps traffic is less than 1.5 (as shown by dashed line 502 or 504), than the NRZ slicer can determine that is a zero.

Figure 6:
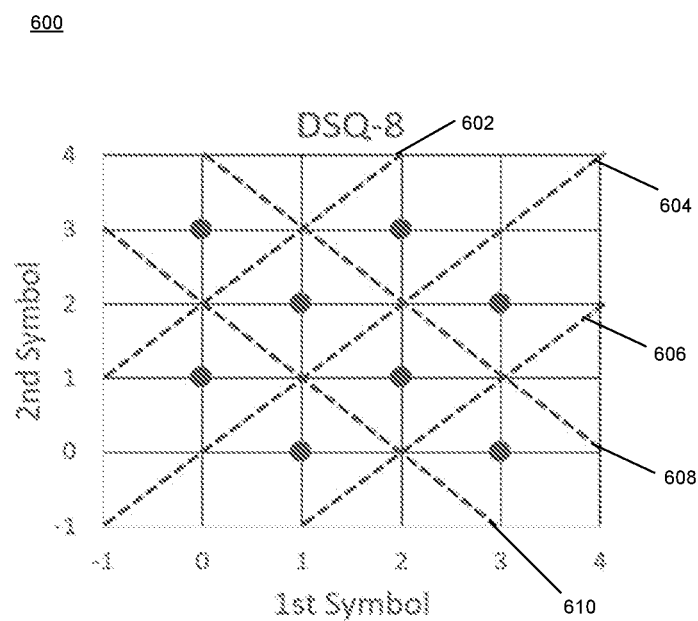
FIG. 6 shows another 2D 2-bit constellation diagram in accordance with various embodiments of the present disclosure.

FIG. 6 shows a 2D 2-bit constellation diagram 600 in accordance with various embodiments of the present disclosure. For example, on a link where the ONU can only recover 75 Gbps and 50 Gbps NRZ, the receiver can implement a DSQ-8 slicer as shown by constellation diagram 600 to recover 75 Gbps traffic and an NRZ slicer as shown in constellation diagram 500 (FIG. 5) to recover 50 Gbps traffic in accordance with various embodiments of the present disclosure. It is noted that in various embodiments, to determine (or recover) a received signal (or symbol) of the 75 Gbps traffic in the DSQ-8 constellation diagram 600, the DSQ-8 slicer uses both the pair of symbols. That is why the diagonals 602, 604, 606, 608, and 610 are included within the DSQ-8 constellation diagram 600. For vertical and horizontal such as shown in the NRZ constellation diagram 500 (FIG. 5), the determination (or recovery) of the 50 Gbps traffic can be done by the NRZ slicer based on a single symbol in time. However, for the DSQ-8 constellation diagram 600, the determination (or recovery) of the 75 Gbps traffic can be done by the DSQ-8 slicer based on both the pair of symbols (e.g., both the 1st and 2nd symbols) as indicated by the diagonals 602, 604, 606, 608, and 610.

Figure 7:
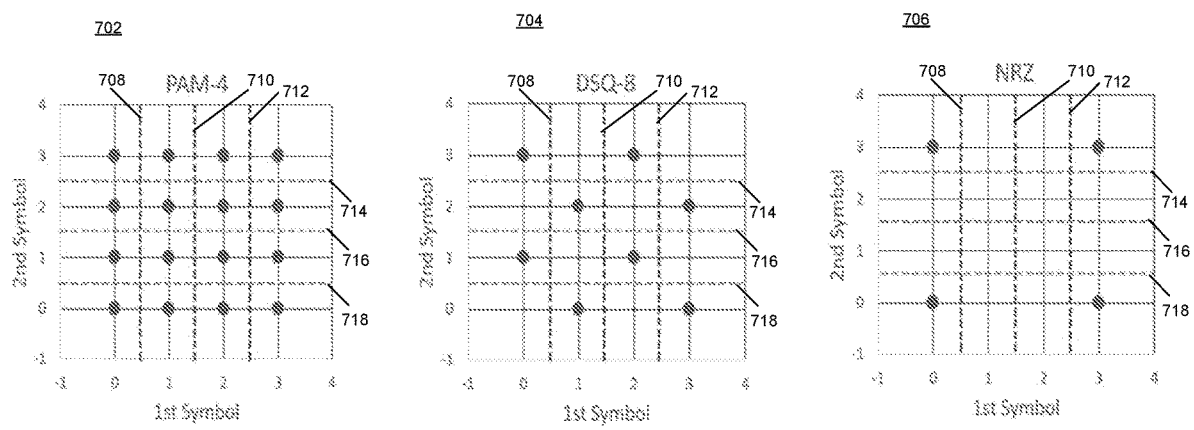
FIG. 7 shows 2D 2-bit constellation diagrams in accordance with various embodiments of the present disclosure.

FIG. 7 shows 2D 2-bit constellation diagrams 702, 704, and 706 in accordance with various embodiments of the present disclosure. For example, on a link where the ONU can recover 100 Gbps (PAM-4) traffic, 75 Gbps (DSQ-8) traffic, and 50 Gbps (NRZ) traffic, the receiver can implement a PAM-4 slicer to recover data for all three rates and modulations. Specifically, the receiver can implement a PAM-4 slicer as shown by constellation diagram 702 to recover 100 Gbps (PAM-4) traffic utilizing vertical dashed lines 708, 710, and 712 or horizontal dashed lines 714, 716, and 718 in accordance with various embodiments of the present disclosure. In addition, the receiver can also implement the PAM-4 slicer as shown by constellation diagram 704 to recover 75 Gbps (DSQ-8) traffic utilizing vertical dashed lines 708, 710, and 712 or horizontal dashed lines 714, 716, and 718 in accordance with various embodiments of the present disclosure. Furthermore, the receiver can also implement the PAM-4 slicer as shown in constellation diagram 706 to recover 50 Gbps (NRZ) traffic utilizing vertical dashed lines 708, 710, and 712 or horizontal dashed lines 714, 716, and 718 in accordance with various embodiments of the present disclosure. It is noted that while the PAM-4 slicer is able to be utilized to recover 100 Gbps (PAM-4) traffic, 75 Gbps (DSQ-8) traffic, and 50 Gbps (NRZ) traffic in various embodiments, the recovery of the 75 Gbps (DSQ-8) traffic and 50 Gbps (NRZ) traffic can be of lower quality because the PAM-4 slicer is not specifically designed for DSQ-8 traffic and NRZ traffic.

In various embodiments, it is noted that on a link where the ONU can recover 100 Gbps (PAM-4) traffic, 75 Gbps (DSQ-8) traffic, and 50 Gbps (NRZ) traffic, the receiver can include and dynamically implement in parallel a PAM-4 slicer to recover 100 Gbps traffic, a DSQ-8 slicer to recover 75 Gbps traffic, and a NRZ slicer to recover 50 Gbps traffic. Specifically, in various embodiments the receiver can include and dynamically implement in parallel a PAM-4 slicer as shown by constellation diagram 702 (FIG. 7) to recover 100 Gbps (PAM-4) traffic, a DSQ-8 slicer as shown by constellation diagram 600 (FIG. 6) to recover 75 Gbps (DSQ-8) traffic, and a NRZ slicer as shown by constellation diagram 500 (FIG. 5) to recover 50 Gbps (NRZ) traffic.

In various embodiments, on a link where the ONU can recover 100 Gbps (PAM-4) traffic, 75 Gbps (DSQ-8) traffic, and 50 Gbps (NRZ) traffic, the receiver can be implemented to include in parallel a PAM-4 slicer, a DSQ-8 slicer, and a NRZ slicer that can be utilized to determine which data type is being received where the receiver examines the signal statistics output by the PAM-4 slicer, DSQ-8 slicer, and NRZ slicer. In addition, the receiver can determine the signal to noise ratio (SNR) of the bits that are being received by the receiver. Based on all this information, the receiver can make a determination on what type of traffic it is receiving and then dynamically use the appropriate slicer (e.g., PAM-4 slicer, DSQ-8 slicer, or NRZ slicer) for recovering that incoming traffic.

Figure 8:
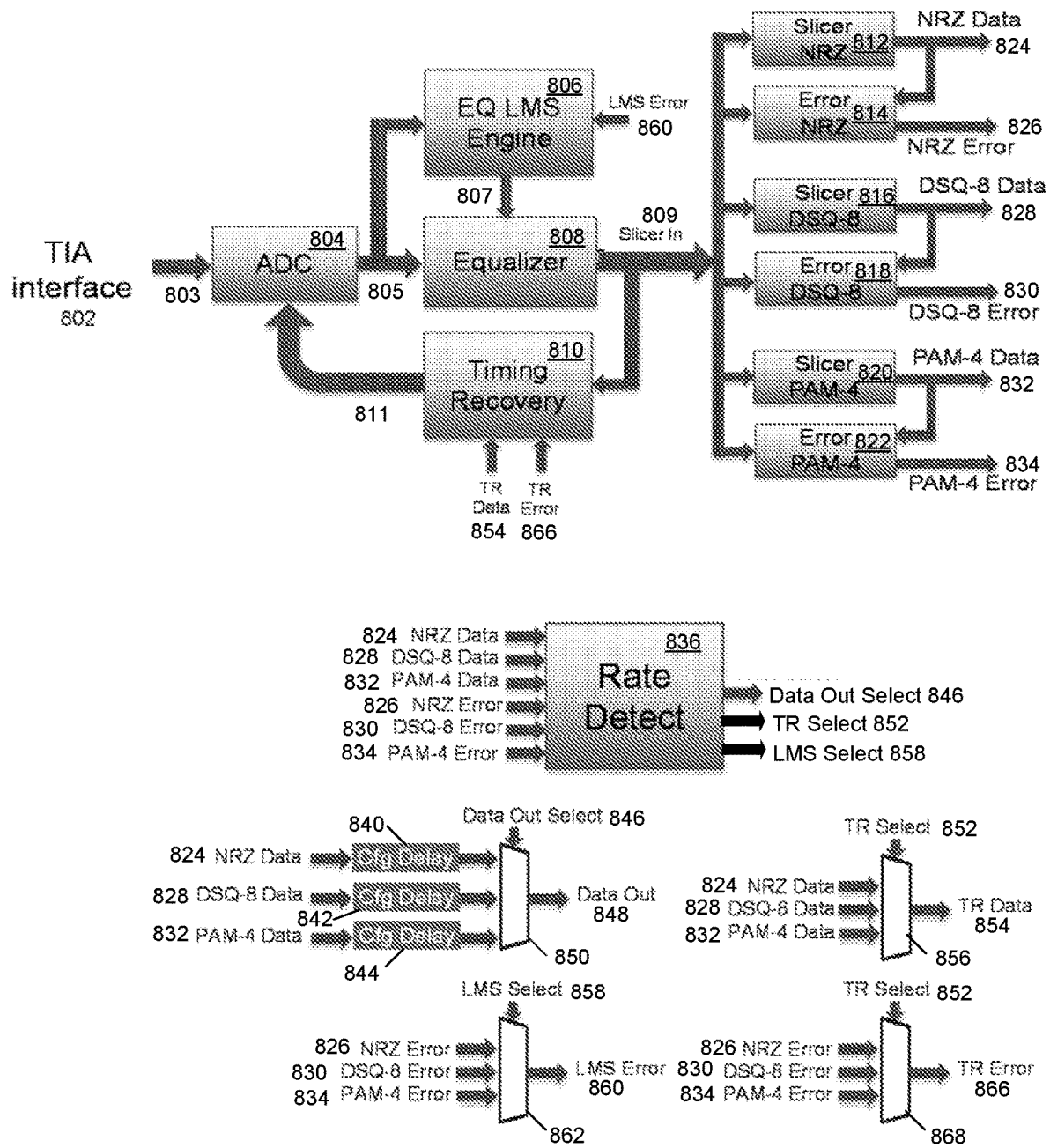
FIG. 8 is a block diagram of a receiver supporting multiple interleaved downstream data rates at a fixed baudrate for flexible passive optical networks in accordance with various embodiments of the present disclosure.

FIG. 8 is a block diagram of a receiver 800 capable of supporting multiple interleaved downstream data rates at a fixed baud-rate for flexible passive optical networks (PON) in accordance with various embodiments of the present disclosure. In various embodiments, the receiver 800 can support, but is not limited to, recovery of interleaved 50 Gbps and 100 Gbps at 50 GBaud or interleaved 50 Gbps, 75 Gbps, and 100 Gbps at 50 GBaud for passive optical network downstream systems.

In various embodiments, on a link where the ONU can recover 100 Gbps (PAM-4) traffic, 75 Gbps (DSQ-8) traffic, and 50 Gbps (NRZ) traffic, the receiver 800 can be implemented to include a PAM-4 slicer block 820, a DSQ-8 slicer block 816, and a NRZ slicer block 812 coupled in parallel that can be utilized by a data detect block 836 of the receiver 800 to determine which data type is being received by examining the signal statistics (e.g., PAM-4 data 832, DSQ-8 data 828, and NRZ data 824) output by the PAM-4 slicer block 820, the DSQ-8 slicer block 816, and the NRZ slicer block 812. In addition, the signal statistics from the slicers 812, 816, and 820 of the receiver 800 can determine the signal to noise ratio (SNR) of the bits that are being received by the receiver 800. Based on this information and other information to be described herein, the data detect block 836 can make a determination on what type of traffic the receiver 800 is receiving and then dynamically use the appropriate slicer (e.g., PAM-4 slicer block 820, DSQ-8 slicer block 816, or NRZ slicer block 812) for recovering that incoming traffic.

With reference to FIG. 8, note that in order to make the determination described above in various embodiments, it is desirable that the receiver 800 first receives some data. Therefore, the receiver 800 can include configuration delay lines 840, 842, and 844 in order for the receiver 800 to accumulate some data and provide some time for the rate detect block 836 to determine what type of data the receiver 800 is receiving before any data 848 is output by the receiver 800. Note that in various embodiments the detection happens on the boundaries. In various embodiments, the receiver 800 is able to dynamically switch between the constellations (e.g., 500, 600, and 702) to achieve continuous data flow.

In various embodiments, the receiver 800 can include, but is not limited to, an analog to digital converter (ADC) 804 that is coupled to receive an input signal 803 from an TIA (transimpedance amplifier) interface 802. In addition, the receiver 800 can include an equalizer 808 that can be implemented with, but is not limited to, a Feed-Forward Equalizer (FFE) or a FFE together with a Decision Feedback Equalizer (DFE), and the receiver 800 can include an equalizer (EQ) least mean squares (LMS) engine 806 which is configured to adapt the taps based on the LMS slicer error 860 and input data 805 that it and the equalizer 808 are both are coupled to receive from the ADC 804. In addition, the receiver 800 can include, but is not limited to, a timing recovery block 810, which is configured to recover the clock frequency and phase from the signal 809 received from the equalizer 808 based on the slicer data (timing recovery (TR) data) 854 and slicer error (TR error) 866.

The receiver 800 of FIG. 8 can further include, but is not limited to, parallel slicer blocks 812, 816, and 820 for each of the three potential data rates 50 Gbps NRZ, 75 Gbps DSQ-8, and 100 Gbps PAM-4, respectively. It is noted that each of the parallel slicer blocks 812, 816, and 820 are coupled to receive the signal 809 that is output by the equalizer 808. In addition, the receiver 800 can further include, but is not limited to, parallel error slicer NRZ block 814, error slicer DSQ-8 block 818, and error slicer PAM-4 block 822 that are each coupled to receive the signal 809 that is output by the equalizer 808. Furthermore, the receiver 800 can include, but is not limited to, a rate detect block 836 that can determine the rate of the received data 803 of the receiver 800 based on the data and/or error output by the slicers blocks 812, 816, and 820 and the error slicer blocks 814, 818, and 822. Specifically, the rate detect block 836 can be coupled to receive the NRZ slicer data 824, DSQ-8 slicer data 828, and PAM-4 slicer data 832 from the slicer NRZ block 812, slicer DSQ-8 block 816, and slicer PAM-4 block 820, respectively. In addition, the rate detect block 836 can be coupled to receive the NRZ error signal 826, DSQ-8 error signal 830, and PAM-4 error signal 834 from the error slicer NRZ block 814, error slicer DSQ-8 block 818, and error slicer PAM-4 block 822, respectively. The receiver 800 can also include, but is not limited to, configurable delay lines 840, 842, and 844 that are each coupled to receive the NRZ slicer data 824, DSQ-8 slicer data 828, and PAM-4 slicer data 832, respectively, from the slicer NRZ block 812, slicer DSQ-8 block 816, and slicer PAM-4 block 820, respectively, to allow for rate detection and selection without glitching of traffic. Note that within the receiver 800, the output(s) of each of the configurable delay lines 840, 842, and 844 can be coupled with input(s) of a multiplexer 850. The multiplexer 850 is coupled to receive a data out select signal 846 from the rate detect block 836 that is configured to control what is output (e.g., data out 848) from the multiplexer 850. It is pointed out that the output data 848 is the output for the receiver 800. In various embodiments, the output data 848 continues on to a switch or house effectively.

The receiver 800 can further include, but is not limited to, a multiplexer 856 that is coupled to receive NRZ slicer data 824, DSQ-8 slicer data 828, and PAM-4 slicer data 832 from the slicer NRZ block 812, slicer DSQ-8 block 816, and slicer PAM-4 block 820, respectively. In addition, the multiplexer 856 can be coupled to receive a timing recovery (TR) data select signal 852 from the rate detect block 836 that causes the multiplexer 856 to output TR data 854 to the timing recovery block 810. The receiver 800 can also include, but is not limited to, a multiplexer 868 that is coupled to receive NRZ error signal 826, DSQ-8 error signal 830, and PAM-4 error signal 834 from the error slicer NRZ block 814, error slicer DSQ-8 block 818, and error slicer PAM-4 block 822, respectively. Moreover, the multiplexer 868 can also be coupled to receive the TR data select signal 852 from the rate detect block 836 that causes the multiplexer 868 to output TR error signal 866 to the timing recovery block 810. The receiver 800 can further include, but is not limited to, a multiplexer 862 that is coupled to receive NRZ error signal 826, DSQ-8 error signal 830, and PAM-4 error signal 834 from the error slicer NRZ block 814, error slicer DSQ-8 block 818, and error slicer PAM-4 block 822, respectively. Furthermore, the multiplexer 862 can also be coupled to receive the LMS select signal 858 from the rate detect block 836 that causes the multiplexer 862 to output LMS error signal 860 to the equalizer (EQ) LMS engine 806.

In various embodiments, the rate detect block 836 of FIG. 8 can be configured in one of three ways, but is not limited to such, to determine the received traffic data rate of the signal 803. For example the first configuration of the rate detect block 836 can be implemented based on the mean-square error (e.g., of error signals 826, 830, and 834 received from error slicer blocks 814, 818, and 822, respectively) of each slicer (e.g., 812, 816, and 820) averaged over a programmable window of up to, but not limited to, 1024 samples is used to determine the nature of the received data by evaluating the mean-squared error of the Rx data over a window of up to, but not limited to, 1024 samples. The second configuration of the rate detect block 836 can be implemented based on evaluating the statistics of the received data (e.g., of data signals 824, 828, and 832) from each of the slicers (e.g., 812, 816, and 820) over a configurable window of up to, but not limited to, 1024 samples. The third configuration of the rate detect block 836 can be implemented based on a combination of the mean-square error (e.g., of error signals 826, 830, and 834 received from error slicer blocks 814, 818, and 822, respectively) of each slicer (e.g., 812, 816, and 820) and statistics of the received data (e.g., of data signals 824, 828, and 832 received from slicers 812, 816, and 820) over a configurable window of up to, but not limited to, 1024 samples. In various embodiments, it is noted that each of the first, second, and third configurations can be implemented to operate with any number of samples that is greater than or less than 1024 samples. In various embodiments, it is noted that each sample can add some latency to the operation of the receiver 800. For example, in various embodiments, every 50 samples can add 1 nanosecond (ns) of latency. Given that, 1000 samples can add 20 ns of latency to the operation of the receiver 800. Therefore, there can be a tradeoff on the amount of samples used by the rate detect block 836 of the receiver 800 against how much latency will be added to the operation of the rate detect block 836.

Based on the determination from the rate select block 836 of the received traffic data rate of the signal 803, the rate select block 836 can output the data out select signal 846 that is received by the multiplexer 850 thereby controlling the data output 848 signal that is selected from the configurable delay lines 840, 842, and 844. The configurable delay lines 840, 842, and 844 are programmed based on the averaging window used for the rate detect block 836. In various embodiments, it is noted that this select signal 846 can also be configured to be overridden to operate on a specific slicer output (e.g., 824, 828, and 832) as selected via configuration.

Within FIG. 8, in various embodiments, note that the LMS select signal 858 can be driven by either the rate detect block 836 or by a configurable select signal. The LMS error select 858 is then used to select error (e.g., 826, 830, and 834 received from error slicer blocks 814, 818, and 822, respectively) from the chosen slicer (e.g., 812, 816, and 820). In various embodiments, the timing recovery block 810 has a unique select signal for the TR data 854 and TR error 864 to be used by the timing recovery block 810 that can be driven by either the rate detect block 836 (e.g., via the multiplexers 856 and 868 that each receive the TR select signal 852 from the rate detect block 836) or by a configurable select signal.

In various embodiments, it is noted that the purpose of each of the slicer blocks 812, 816, and 820 is to determine what the value is of each bit it receives.

In various embodiments, the receiver 800 of FIG. 8 can include the ADC 804 that is coupled to receive the input signal 803 from the TIA interface 802. The ADC 804 is coupled to provide an output signal 805 to the EQ LMS engine 806 and the equalizer 808. The EQ LMS engine 806 is coupled to receive the LMS error 860 from multiplexer 862 and is also coupled to output a signal 807 to the equalizer 808. The equalizer 808 is coupled to provide the slicer input signal 809 to the timing recovery block 810, slicer NRZ block 812, error slicer NRZ block 814, slicer DSQ-8 block 816, error slicer DSQ-8 block 818, slicer PAM-4 block 820, and error slicer PAM-4 block 822. Note that the slicer NRZ block 812 is coupled to output the NRZ data 824 to the error slicer NRZ block 814, the rate detect block 836, the configurable delay 840, and the multiplexer 856. Furthermore, the error slicer NRZ block 814 is coupled to output the NRZ error 826 to the rate detect block 836, the multiplexer 862, and the multiplexer 868. The slicer DSQ-8 block 816 is coupled to output the DSQ-8 data 828 to the error slicer DSQ-8 block 818, the rate detect block 836, the configurable delay 842, and the multiplexer 856. Additionally, the error slicer DSQ-8 block 818 is coupled to output the DSQ-8 error 830 to the rate detect block 836, the multiplexer 862, and the multiplexer 868. The slicer PAM-4 block 820 is coupled to output the PAM-4 data 832 to the error slicer PAM-4 block 822, the rate detect block 836, the configurable delay 844, and the multiplexer 856. Moreover, the error slicer PAM-4 block 822 is coupled to output the PAM-4 error 834 to the rate detect block 836, the multiplexer 862, and the multiplexer 868.

In various embodiments, note that the configurable delay lines 840, 842, and 844 can be coupled to output the NRZ data 824, DSQ-8 data 828, and PAM-4 data 832, respectively, to the multiplexer 850. It is noted that the multiplexer 850 is coupled to receive the data out select 846 from the rate detect block 836 and note that the multiplexer 850 is also coupled to output the data out 848 for the receiver 800. The multiplexer 856 is coupled to receive the TR select 852 from the rate detect block 836 and note that the multiplexer 856 is also coupled to output the TR data 854 to the timing recovery block 810. The multiplexer 862 is coupled to receive the LMS select 858 from the rate detect block 836 and note that the multiplexer 862 is also coupled to output the LMS error 860 to the EQ LMS engine 806. The multiplexer 868 is coupled to receive the TR select 852 from the rate detect block 836 and note that the multiplexer 868 is also coupled to output the TR error 866 to the timing recovery block 810. It is noted that the rate detect block 836 is coupled to output the data out select 846 to multiplexer 850. In addition, the rate detect block 836 is coupled to output the TR select 852 to both the multiplexers 856 and 868. Moreover, the rate detect block 836 is coupled to output the LMS select 858 to the multiplexer 862. Note that the timing recovery block 810 is coupled to output the signal(s) 811 to the ADC 804.

It is noted that the receiver 800 may not include all of the elements illustrated by FIG. 8. In addition, the receiver 800 can be implemented to include one or more elements not illustrated by FIG. 8. It is pointed out that the receiver 800 can be utilized or implemented in any manner similar to that described and/or shown herein, but is not limited to such.

Figure 9:
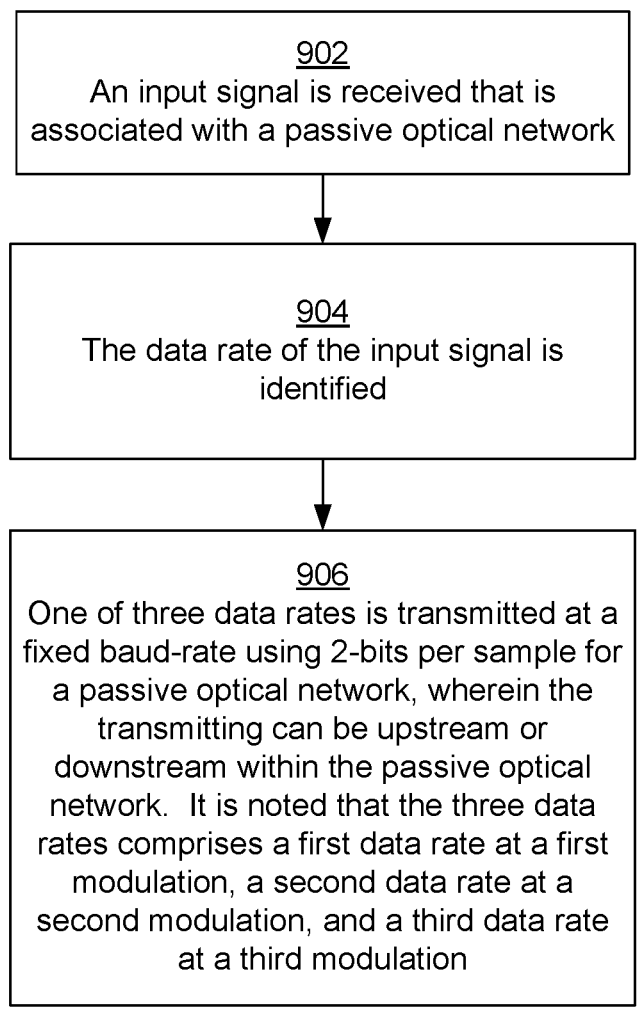
FIG. 9 is a method in accordance with various embodiments of the present disclosure.

FIG. 9 is a method 900 in accordance with various embodiments of the present disclosure.

At operation 902, an input signal is received that is associated with a passive optical network. Note that operation 902 can be implemented in a wide variety of ways. For example, operation 902 can be implemented in any manner similar to that described and/or shown by the present disclosure, but is not limited to such.

At operation 904 of FIG. 9, the data rate of the input signal is identified. Note that operation 904 can be implemented in a wide variety of ways. For example, operation 904 can be implemented in any manner similar to that described and/or shown by the present disclosure, but is not limited to such.

At operation 906, one of three data rates is transmitted at a fixed baud-rate using 2-bits per sample for a passive optical network, wherein the transmitting can be upstream or downstream within the passive optical network. It is noted that the three data rates comprises a first data rate at a first modulation, a second data rate at a second modulation, and a third data rate at a third modulation. In various embodiments, the first rate comprises 50 gigabits per second (Gbps) and the first modulation comprises non-return-to-zero (NRZ) modulation, the second rate comprises 75 Gbps and the second modulation comprises double square-8 (DSQ-8) modulation, and the third rate comprises 100 Gbps and the third modulation comprises four-level pulse-amplitude modulation (PAM-4). In various embodiments, it is pointed out that operation 906 can be performed dynamically based on the identified data rate of the input signal. Note that operation 906 can be implemented in a wide variety of ways. For example, operation 906 can be implemented in any manner similar to that described and/or shown by the present disclosure, but is not limited to such.

Figure 10:
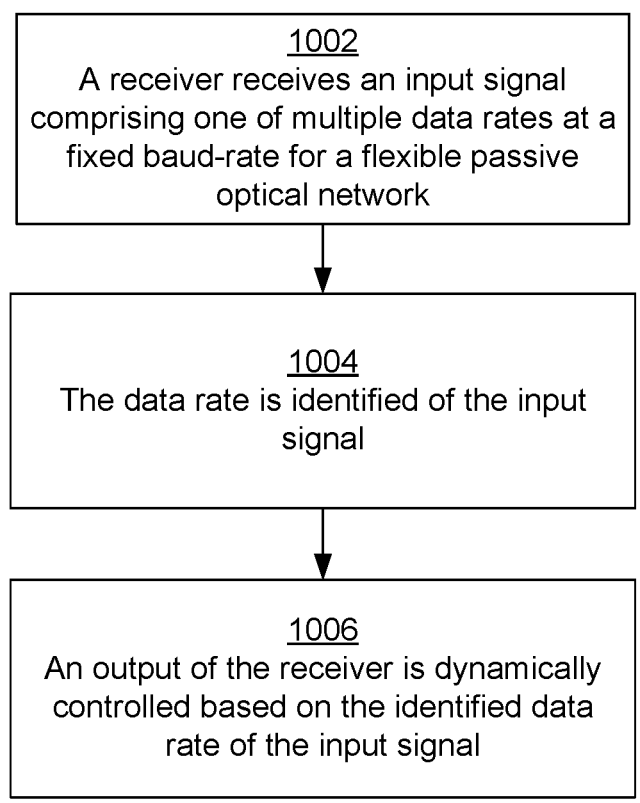
FIG. 10 is a method in accordance with various embodiments of the present disclosure.

FIG. 10 is a method 1000 in accordance with various embodiments of the present disclosure.

At operation 1002, a receiver (e.g., 800) receives an input signal comprising one of multiple data rates at a fixed baud-rate for a flexible passive optical network. In various embodiments, the multiple data rates comprise a first [date] data rate comprising a first modulation; a second data rate comprising a second modulation; and a third data rate comprising a third modulation where each of the first modulation, second modulation, and third modulation are different. In various embodiments, the first modulation comprises non-return-to-zero (NRZ) modulation, the second modulation comprises double square-8 (DSQ-8) modulation, and the third modulation comprises four-level pulse-amplitude modulation (PAM-4). In various embodiments, the first data rate comprises 50 gigabits per second (Gbps), the second data rate comprises 75 Gbps, and the third data rate comprises 100 Gbps. Note that operation 1002 can be implemented in a wide variety of ways. For example, operation 1002 can be implemented in any manner similar to that described and/or shown by the present disclosure, but is not limited to such.

At operation 1004 of FIG. 10, the data rate is identified (or determined) of the input signal. Note that operation 1004 can be implemented in a wide variety of ways. For example, operation 1004 can be implemented in any manner similar to that described and/or shown by the present disclosure, but is not limited to such.

At operation 1006, an output (e.g., 848) of the receiver is dynamically controlled based on the identified data rate of the input signal. Note that operation 1006 can be implemented in a wide variety of ways. For example, operation 1006 can be implemented in any manner similar to that described and/or shown by the present disclosure, but is not limited to such.

Figure 11:
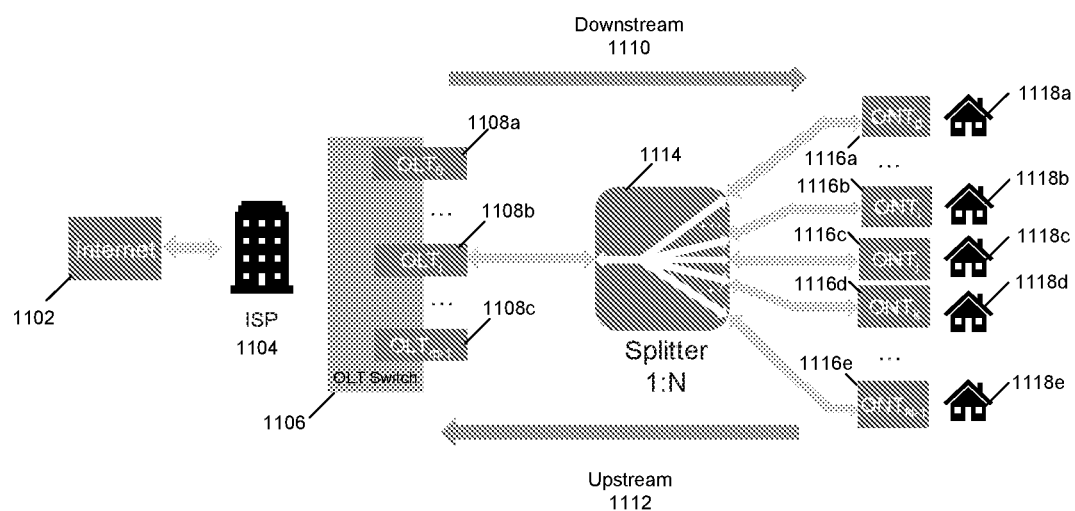
FIG. 11 is a block diagram of a PON system in accordance with various embodiments of the present disclosure.

FIG. 11 is a block diagram of a passive optical networks (PON) system 1100 in accordance with various embodiments of the present disclosure. In various embodiments, it is noted that any embodiment described and/or shown by the present disclosure can be implemented as part of (or within) the PON system 1100, but is not limited to such. In various embodiments, the PON system 1100 can be for sending 50 Gbps, 75 Gbps, and 100 Gbps at 50 GBaud for PON downstream 1110 and upstream 1112. More specifically, the system 1100 allows for transmission of three data rates at a single baud-rate while only using 2-bits of information per sample. Note that within system 1100, a motivation for sending three data rates at a single baud-rate is to allow for further granularity in the control of the data-rates for downstream 1110 and upstream 1112 traffic in a flexible PON system 1100 based on the link margin. For example, in various embodiments, the system 1100 can use NRZ at 50 GBaud for 50 Gbps, can use DSQ-8 at 50 GBaud for 75 Gbps, and can use PAM-4 at 50 GBaud for 100 Gbps. It is noted that utilizing the DSQ-8 constellation allows for 1.5 bits to be sent per sample, by encoding 3-bits of information into two successive 2-bit samples. In various embodiments, note that the system 1100 is not adding significant complexity to a system that only sends 50 Gbps and 100 Gbps at 50 GBaud for a flexible PON downstream and upstream. In various embodiments, the system 1100 can basically use similar components for the most part that would be used for a system that only sends 50 Gbps and 100 Gbps at 50 GBaud for flexible PON downstream and upstream with some slight additional processing and adds another rate (e.g., 75 Gbps) transparently to the transmitter with little overhead to the receiver (e.g., as described herein) and without latency overhead. In this manner, faster reception of data upstream 1112 and downstream 1110 can be provided in the flexible PON system 1100 in various embodiments.

In various embodiments, the PON system 1100 can include the Internet 1102 that can be coupled with an Internet Service Provider (ISP) 1104. Note that the ISP 1104 can include one or more OLT switches (e.g., 1106). In addition, each OLT switch 1106 can include one or more OLTs (e.g., 1108a, 1108b, and/or 1108c). The OLT 1108b can be coupled with a splitter (1:N) 1114. It is noted that each of the OLTs 1108a and 1108c can be coupled with a splitter (1:N) similar to splitter 1114. The splitter 1114 can be coupled with one or more ONTs (e.g., 1116a, 1116b, 1116c, 1116d, and/or 1116e). In various embodiments, each of the ONTs 1116a, 1116b, 1116c, 1116d, and 1116e can be associated with each of the buildings (or houses or structures or businesses) 1118a, 1118b, 1118c, 1118d, and 1118e, respectively.

In various embodiments, the downstream traffic 1110 of the PON system 1100 of FIG. 11 can be implemented to include, but is not limited to, broadcasting at varying rates such as 50 Gbps (NRZ), 75 Gbps (DSQ-8), and 100 Gbps (PAM-4) at a single wavelength such as 50 GBaud. In this manner, each ONT (e.g., 1116a, 1116b, 1116c, 1116d, and 1116e) can receive data traffic at varying rates such as 50 Gbps (NRZ), 75 Gbps (DSQ-8), and 100 Gbps (PAM-4) at a single wavelength such as 50 GBaud, but is not limited to such. In addition, in various embodiments, the upstream traffic 1112 of the system 1100 can be implemented to include, but is not limited to, interleaving bursts of traffic from each ONT (e.g., 1116a, 1116b, 1116c, 1116d, and 1116e) such that the bursts can be either 50 Gbps (NRZ), 75 Gbps (DSQ-8), and 100 Gbps (PAM-4). In this manner, each OLT (e.g., 1108b) can receive interleaved bursts of traffic at 50 Gbps (NRZ), 75 Gbps (DSQ-8), and 100 Gbps (PAM-4), but is not limited to such.

It is noted that the PON system 1100 may not include all of the elements illustrated by FIG. 11. In addition, the system 1100 can be implemented to include one or more elements not illustrated by FIG. 11. It is pointed out that the system 1100 can be utilized or implemented in any manner similar to that described and/or shown herein, but is not limited to such.

Note that the following are examples in accordance with various embodiments of the present disclosure.

Example 1. An optical network receiver comprising:
  a first rate slicer coupled to receive an input signal and configured to recover data at a first rate and a first modulation;
  a second rate slicer coupled to receive the input signal and configured to recover data at a second rate and a second modulation;
  a third rate slicer coupled to receive the input signal and configured to recover data at a third rate and a third modulation, wherein the first, second, and third rate slicers are coupled in parallel to receive the input signal; and
  a rate detect block coupled to receive an output from the first rate slicer, an output from the second rate slicer, and an output from the third rate slicer, wherein the rate detect block is configured to determine the rate of the input signal received by the optical network receiver.

Example 2. The optical network receiver of Example 1, wherein the rate detect block is configured to dynamically control an output signal of the optical network receiver based on the determined rate of the input signal.

Example 3. The optical network receiver of Example 1, wherein the first rate comprises 50 gigabits per second (Gbps) and the first modulation comprises non-return-to-zero (NRZ) modulation and the second rate comprises 75 Gbps and the second modulation comprises double square-8 (DSQ-8) modulation.

Example 4. The optical network receiver of Example 3, wherein the third rate comprises 100 Gbps and the third modulation comprises four-level pulse-amplitude modulation (PAM-4).

Example 5. The optical network receiver of Example 1, wherein the second rate comprises 75 Gbps and the second modulation comprises DSQ-8 modulation and the third rate comprises 100 Gbps and the third modulation comprises PAM-4.

Example 6. The optical network receiver of Example 1, wherein the input signal comprises a fixed baud-rate.

Example 7. The optical network receiver of Example 2, wherein the input signal comprises a fixed baud-rate.

Example 8. The optical network receiver of Example 4, wherein the input signal comprises a fixed baud-rate.

Example 9. The optical network receiver of Example 1, further comprising:
  a first rate error block coupled to receive the input signal and coupled to receive the output from the first rate slicer;
  a second rate error block coupled to receive the input signal and coupled to receive the output from the second rate slicer; and
  a third rate error block coupled to receive the input signal and coupled to receive the output from the third rate slicer,
  wherein the rate detect block coupled to receive an output from the first rate error block, the second rate error block, and the third rate error block.

Example 10. A method comprising:
  transmitting one of three data rates at a fixed baud-rate using 2-bits per sample for a passive optical network, wherein the transmitting can be upstream or downstream within the passive optical network;
  wherein the three data rates comprises a first data rate at a first modulation, a second data rate at a second modulation, and a third data rate at a third modulation.

Example 11. The method of Example 10, further comprising:
  receiving an input signal; and
  identifying the data rate of the input signal.

Example 12. The method of Example 11, wherein the transmitting is performed dynamically based on the identified data rate of the input signal.

Example 13. The method of Example 10, wherein the first rate comprises 50 gigabits per second (Gbps) and the first modulation comprises non-return-to-zero (NRZ) modulation and the second rate comprises 75 Gbps and the second modulation comprises double square-8 (DSQ-8) modulation.

Example 14. The method of Example 13, wherein the third rate comprises 100 Gbps and the third modulation comprises four-level pulse-amplitude modulation (PAM-4).

Example 15. The method of Example 10, wherein the second rate comprises 75 Gbps and the second modulation comprises DSQ-8 modulation and the third rate comprises 100 Gbps and the third modulation comprises PAM-4.

Example 16. A method comprising:
  receiving via a receiver an input signal comprising one of multiple data rates at a fixed baud-rate for a flexible passive optical network;
  identifying the data rate of the input signal; and
  dynamically controlling an output of receiver based on the identified data rate of the input signal.

Example 17. The method of Example 16, wherein the multiple data rates comprise:
  a first data rate comprising a first modulation;
  a second data rate comprising a second modulation;
  a third data rate comprising a third modulation;
  wherein each of the first modulation, second modulation, and third modulation are different.

Example 18. The method of Example 17, wherein the first modulation comprises non-return-to-zero (NRZ) modulation and the second modulation comprises double square-8 (DSQ-8) modulation.

Example 19. The method of Example 18, wherein the third modulation comprises four-level pulse-amplitude modulation (PAM-4).

Example 20. The method of Example 19, wherein the first data rate comprises 50 gigabits per second (Gbps), the second data rate comprises 75 Gbps, and the third data rate comprises 100 Gbps.

Various embodiments of the present disclosure are thus described. While the present disclosure has been described in particular embodiments, it should be appreciated that the present disclosure should not be construed as limited by such embodiments, but rather construed according to the following claims.

What is claimed is:

1. An optical network receiver comprising:
   a first rate slicer coupled to receive an input signal and configured to recover data at a first rate and a first modulation;
   a second rate slicer coupled to receive the input signal and configured to recover data at a second rate and a second modulation;
   a third rate slicer coupled to receive the input signal and configured to recover data at a third rate and a third modulation, wherein the first, second, and third rate slicers are coupled in parallel to receive the input signal;
   a rate detect block coupled to receive an output from the first rate slicer, an output from the second rate slicer, and an output from the third rate slicer, wherein the rate detect block is configured to determine the rate of the input signal received by the optical network receiver;
   a first rate error block coupled to receive the input signal and coupled to receive the output from the first rate slicer;
   a second rate error block coupled to receive the input signal and coupled to receive the output from the second rate slicer; and
   a third rate error block coupled to receive the input signal and coupled to receive the output from the third rate slicer,
   wherein the rate detect block coupled to receive an output from the first rate error block, the second rate error block, and the third rate error block.

2. The optical network receiver of claim 1, wherein the rate detect block is configured to dynamically control an output signal of the optical network receiver based on the determined rate of the input signal.

3. The optical network receiver of claim 2, wherein the input signal comprises a fixed baud-rate.

4. The optical network receiver of claim 1, wherein the first rate comprises 50 gigabits per second (Gbps) and the first modulation comprises non-return-to-zero (NRZ) modulation and the second rate comprises 75 Gbps and the second modulation comprises double square-8 (DSQ-8) modulation.

5. The optical network receiver of claim 4, wherein the third rate comprises 100 Gbps and the third modulation comprises four-level pulse-amplitude modulation (PAM-4).

6. The optical network receiver of claim 5, wherein the input signal comprises a fixed baud-rate.

7. The optical network receiver of claim 1, wherein the second rate comprises 75 Gbps and the second modulation comprises DSQ-8 modulation and the third rate comprises 100 Gbps and the third modulation comprises PAM-4.

8. The optical network receiver of claim 1, wherein the input signal comprises a fixed baud-rate.

9. A method comprising:
   receiving via a receiver an input signal comprising one of multiple data rates at a fixed baud-rate for a flexible passive optical network;
   identifying the data rate of the input signal; and
   dynamically controlling an output of receiver based on the identified data rate of the input signal;
   wherein the multiple data rates comprise:
   a first data rate comprising a first modulation;
   a second data rate comprising a second modulation;
   a third data rate comprising a third modulation;
   wherein each of the first modulation, second modulation, and third modulation are different;
   wherein the first modulation comprises non-return-to-zero (NRZ) modulation, the second modulation comprises double square-8 (DSQ-8) modulation, and the third modulation comprises four-level pulse-amplitude modulation (PAM-4);
   wherein the first data rate comprises 50 gigabits per second (Gbps), the second data rate comprises 75 Gbps, and the third data rate comprises 100 Gbps.

10. The method of claim 9, wherein the receiver comprises a rate detect block, wherein the rate detect block performs the identifying.

11. The method of claim 10, wherein the rate detect block performs the dynamically controlling.

12. The method of claim 9, wherein the receiver comprises a rate detect block, wherein the rate detect block performs the dynamically controlling.

13. An optical network receiver comprising:
   a first rate slicer coupled to receive an input signal and configured to recover data at a first rate and a first modulation;
   a second rate slicer coupled to receive the input signal and configured to recover data at a second rate and a second modulation;
   a third rate slicer coupled to receive the input signal and configured to recover data at a third rate and a third modulation, wherein the first, second, and third rate slicers are coupled in parallel to receive the input signal; and
   a rate detect block coupled to receive an output from the first rate slicer, an output from the second rate slicer, and an output from the third rate slicer, wherein the rate detect block is configured to determine the rate of the input signal received by the optical network receiver;
   wherein the first rate comprises 50 gigabits per second (Gbps) and the first modulation comprises non-return-to-zero (NRZ) modulation and the second rate comprises 75 Gbps and the second modulation comprises double square-8 (DSQ-8) modulation.

14. The optical network receiver of claim 13, wherein the rate detect block is configured to dynamically control an output signal of the optical network receiver based on the determined rate of the input signal.

15. The optical network receiver of claim 14, wherein the input signal comprises a fixed baud-rate.

16. The optical network receiver of claim 13, wherein the third rate comprises 100 Gbps and the third modulation comprises four-level pulse-amplitude modulation (PAM-4).

17. The optical network receiver of claim 16, wherein the input signal comprises a fixed baud-rate.

18. The optical network receiver of claim 13, wherein the input signal comprises a fixed baud-rate.

19. The optical network receiver of claim 13, further comprising:
a first rate error block coupled to receive the input signal and coupled to receive the output from the first rate slicer,
wherein the rate detect block coupled to receive an output from the first rate error block.

20. The optical network receiver of claim 19, further comprising:
a second rate error block coupled to receive the input signal and coupled to receive the output from the second rate slicer,
wherein the rate detect block coupled to receive an output from the second rate error block.

* * * * *